United States Patent [19]
Amagami et al.

[11] 3,828,163
[45] Aug. 6, 1974

[54] ELECTRIC OVEN

[75] Inventors: Keizo Amagami, Neyagawa; Toshii Tsugeki, Takatsuki; Yasuo Ogo, Kawanishi; Yoshinori Mitani, Minoo; Hiromutsu Ueda, Ibaragi; Takeo Nishida, Ikeda; Atsuo Ono, Katano, all of Japan

[73] Assignee: Matsushita Electric Industrial Co., Ltd., Osaka, Japan

[22] Filed: Jan. 29, 1973

[21] Appl. No.: 327,471

[30] Foreign Application Priority Data
Feb. 31, 1972 Japan.................................. 47-11639

[52] U.S. Cl................. 219/413, 219/396, 219/399, 219/405, 219/408, 219/411
[51] Int. Cl............................................ F27d 11/02
[58] Field of Search ........... 219/396, 399, 400, 405, 219/407, 408, 411, 412, 413

[56] References Cited
UNITED STATES PATENTS

| | | | |
|---|---|---|---|
| 2,862,096 | 11/1958 | Gordon........................... | 219/412 X |
| 3,036,193 | 5/1962 | Allen, Jr. ........................ | 219/408 X |
| 3,215,816 | 11/1965 | Perl................................... | 219/400 |
| 3,353,004 | 11/1967 | Alexander...................... | 219/413 X |
| 3,585,360 | 6/1971 | Young et al. ..................... | 219/405 |
| 3,626,155 | 12/1971 | Joeckel............................. | 219/411 |
| 3,659,068 | 4/1972 | Duffner et al. .................. | 219/413 X |

*Primary Examiner*—Volodymyr Y. Mayewsky
*Attorney, Agent, or Firm*—Stevens, Davis, Miller & Mosher

[57] ABSTRACT

An electric oven convenient for general purposes capable of selectively performing the convection heating in which the variational temperature width is very small and foods can be cooked with no scorching, the infrared radiation heating in which the temperature fluctuation is large and scorching is formed on the cooked foods, and the fermenting heating for raising bread with yeast, the oven comprises a controlling means including a thyristor, etc. and a combination of a gate circuit means for said thyristor and a temperature detecting means.

12 Claims, 25 Drawing Figures

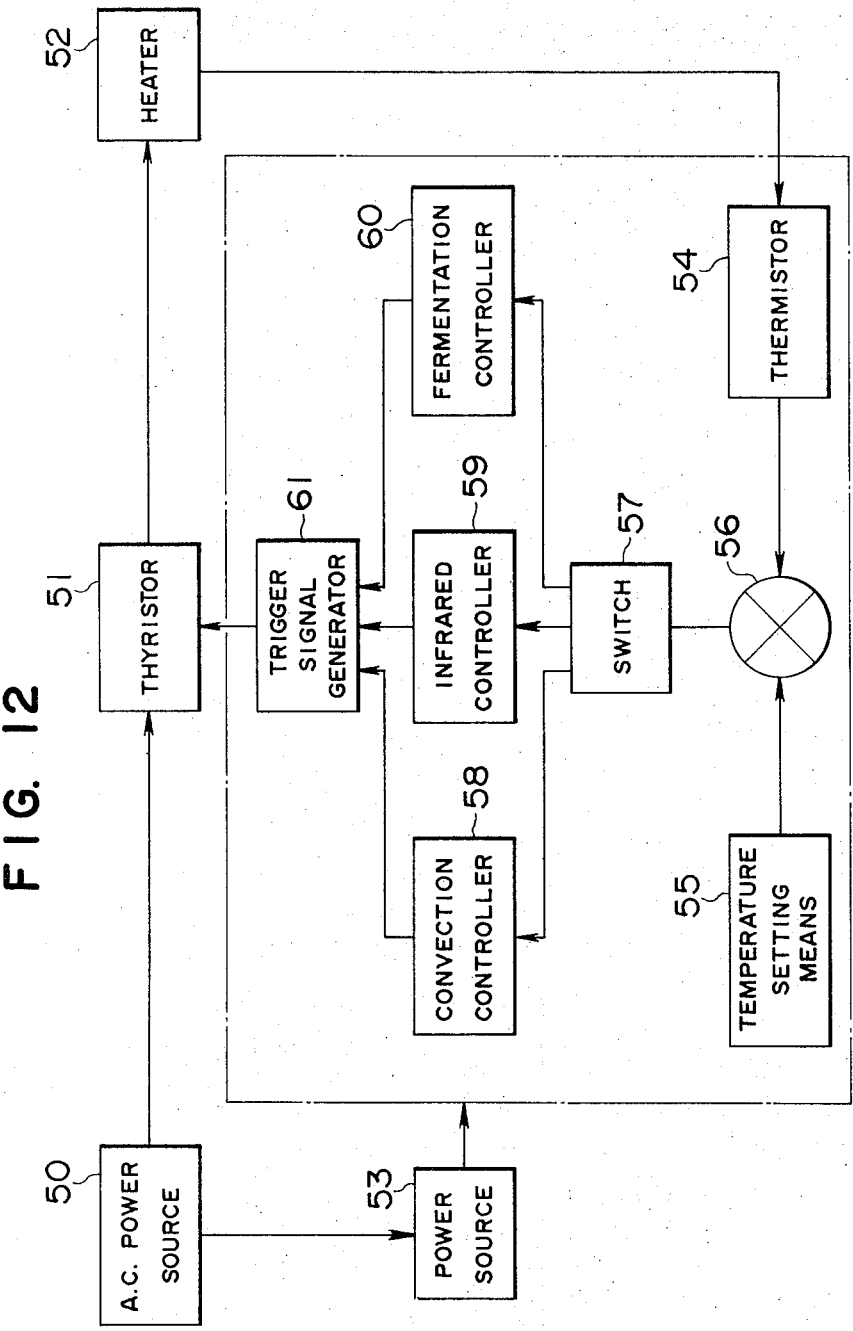

ELECTRIC OVEN

This invention relates to an electric oven.

In conventional electric ovens, temperature control has been obtained mostly through a mechanical thermostat. With a mechanical thermostat, however, temperature variations of ± 20° to 30°C with respect to a set temperature inevitably arise even in an equilibrium state and thus some foods cannot be cooked well. Namely, fish, meat, etc. needs scorching heating and cakes, egg dishes, etc. needs scorchless heating. For the former cuisine infrared radiation heating is fitted, whereas convention heating is fitted for the latter cuisine. With a conventional mechanical thermostat, however, the changeover of the heating system cannot be done according to the food to be cooked and thus some foods can be cooked well in an electric oven, but some other cannot be cooked well. Further, temperature control near room temperature has been difficult with conventional means. For example, for raising bread with yeast, the temperature should preferably be controlled at 36 ± 4°C, but this has been very difficult with a conventional control system.

Thus, this invention is intended to eliminate these drawbacks. According to this invention, an electric oven comprises heating means disposed in a heating chamber formed with a main housing, circuit means including means for controlling the convection heating, means for controlling the infrared radiation heating, and means for controlling the yeast fermenting heating, a controlling element connected serially with said heating means and having a gate circuit capable of being selectively connected to one of said means for controlling the heating.

An object of this invention is to provide an electric oven capable of selecting the scorching heating fitted for cooking fish, meat, etc. and the scorchless heating fitted for cooking cakes, etc. without exchanging the heating means and further capable of providing heating for fermenting yeast for raising bread.

Another object of this invention is to provide an electric oven capable of precisely controlling the temperature for fermenting yeast.

A further object of this invention is to provide an electric oven capable of precisely controlling the temperature of the convection and infrared radiation heating and the heating for fermenting yeast, the adjustment of the heating temperature for fermenting yeast in the manufacturing processes being arranged easily.

A further object of this invention is to provide an electric oven, the assembly and the service of which are easy.

Another object of this invention is to provide an electric oven capable of performing infrared heating only in the temperature range (for example above 200°C) in which infrared heating is effective.

Another object of this invention is to provide an effective electric oven having a uniform temperature distribution in the heating and cooking chamber.

Another object of this invention is to provide electric oven having an improved manufacturing and cooking efficiency, superior strength, and good heat efficiency, thereby decreasing the possibility of burning an operator.

Another object of this invention is to provide an low cost electric oven which can be easily disassembled and assembled and thereby easily washed.

Another object of this invention is to provide an electric oven in which the controlling element for controlling the heater means has an improved heat radiating efficiency.

Another object of this invention is to provide an electric oven in which an inner tub forming a heating chamber can be easily removed and mounted and at the same time the possibility of burning an operator is reduced.

Another object of this invention is to provide an electric oven in which the temperature distribution in the heating and cooking chamber is made uniform to thereby eliminate a leading temperature peak in increasing the temperature.

Another object of this invention is to provide an electric oven in which the temperature control in the heating for fermenting yeast is accurate and thereby an excess temperature increase in the heating and cooking chamber is prevented.

According to an embodiment of this invention, there is provided an electric oven comprising:
a main housing;
a heating chamber formed in said main housing and including heater means and temperature detecting means for determining the temperature in the heating chamber;
and
controlling means including a control element having a gate circuit activates by the output signal of said temperature detecting means, thereby the electric oven being capable of selecting the connection heating having a very small temperature variation width to generate no scorching, the infrared radiation heating having a relatively large temperature variation width to generate scorching, and the yeast fermenting heating for raising bread through said gate circuit.

Now, this invention will be described more in detail by the way of preferred embodiments in connection with the accompanying drawings, in which:

FIG. 12 is a basic electric block diagram of the present electric oven;

Figure 1:
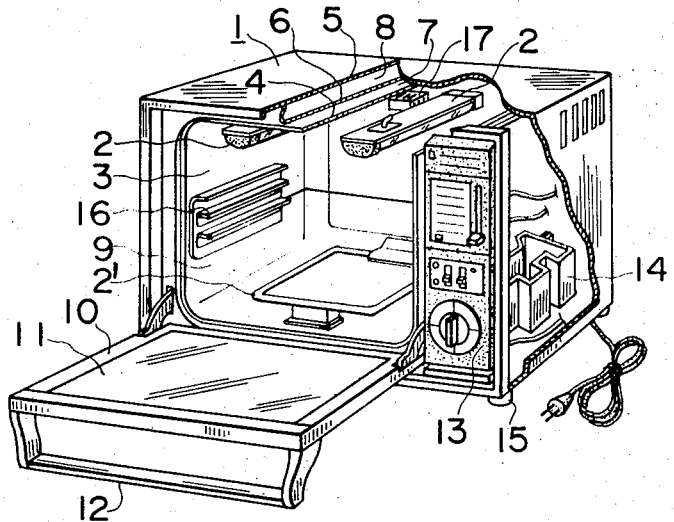
FIG. 1 is a total perspective view of an embodiment of an electric oven according to this invention.

FIG. 1 is a perspective view of an oven, in which the main housing 1 comprises an inner tube 4 surrounding a heating and cooking chamber 3 equipped with heaters 2 and 2' and an outer tub 5. Between the inner and the outer tubs 4 and 5 there is provided a heat shielding tub 6. Thus, a triple heat insulating structure is formed of an air layer 7 between the inner tub 4 and the heat shielding tube 6, another air layer 8 between the heat shielding tub 6 and the outer tub 5 and the heat shielding tub 6. In the front portion, there is formed an opening 9 which is closed and opened with a door 10. The door 10 has a glass window 11 for watching the inside and a door lever 12. An operation panel 13 is disposed in the front surface. Electronic circuit parts for controlling said heaters 2 and 2' are located on the back surface of the panel 13. Numeral 14 indicates heat radiating fins for mounting controlling elements which are parts of the electric circuit, 15 legs, and 16 guide sleeves for loading a baking plate, etc. A thermistor box 17 is disposed on the back plate of the inner tub 4 and includes a thermistor (temperature detecting element) for detecting the temperature in the oven.

Figure 2:
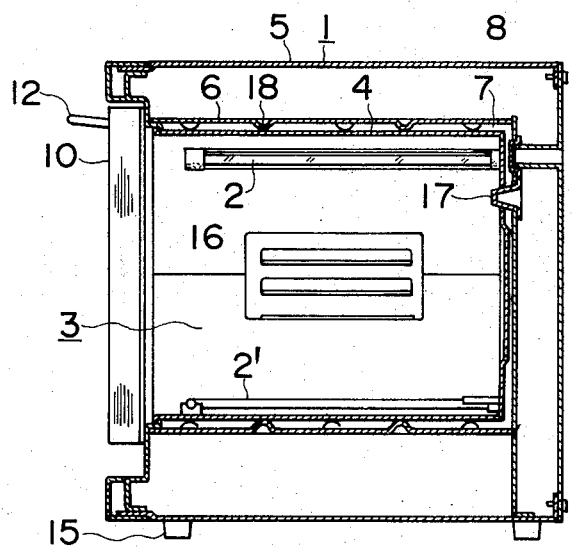
FIG. 2 is a cross-section of the electric oven shown in FIG. 1.

FIG. 2 is a cross section of the oven shown in FIG. 1. As shown, a plurality of projections 18 is formed on the inner surface of the peripheral wall of the heat shielding tub 6 and form point contacts with the inner tub 4 which is slidably inserted in the heat shielding tub 6.

Figure 3:
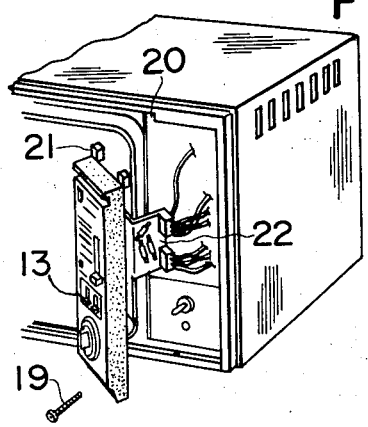
FIG. 3 is a disassembled perspective partial view showing the structure of an operation board.

FIG. 3 shows how electronic parts are installed in the oven, the parts being easily assembled and serviced and of low cost. An operation board 13 is detachably fixed on the front surface of the main housing 1 with a screw 19 and projections 21 which are formed in conjunction with cut-away grooves 20 formed in the main housing 1. A heater controlling circuit is wired by printing on a print substrate 22 which is detachably fixed to the operation board 13.

Figure 4:
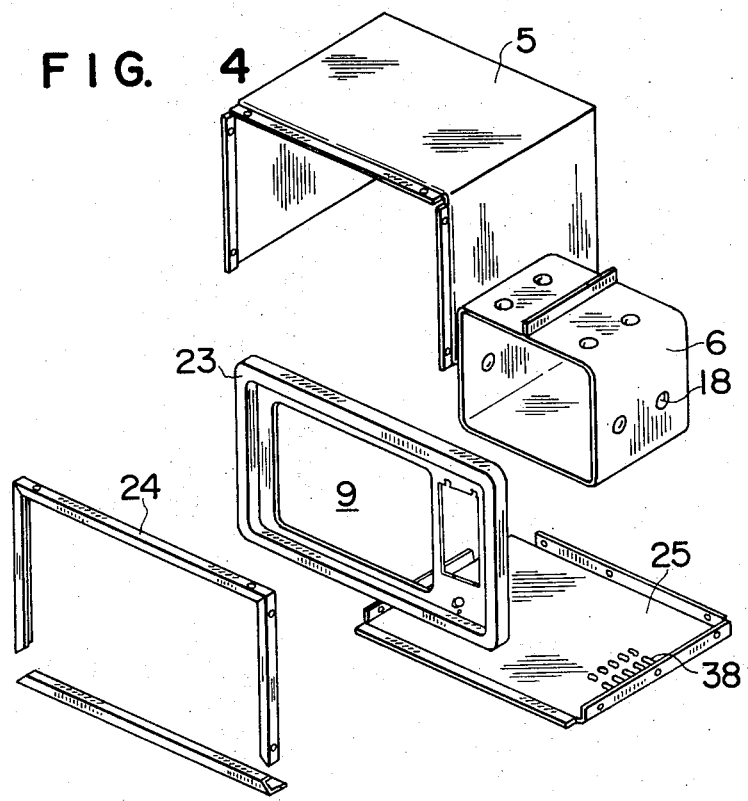
FIG. 4 is a disassembled perspective view of the main housing.

The detailed structure and the assembly of the main housing 1 are illustrated in FIG. 4. The structure is easy to make and convenient to use and has a good solidity. The housing structure includes the heat shielding tub 6, the outer tub 5, a front plate 23 having the opening 9, and a decorating frame 24. A base plate 25 fixes the front plate 23 to the heat shielding tub 6.

In assembling the oven of said structure, the front plate 23 is first fixed to the base plate 25 by spot welding, etc. and then the heat shielding tub 6 is inserted in the opening 9 of the front plate 23 and fixed by spot welding, etc. After the base plate 25 and the heat shielding tub 6 are completely fixed in said manner, the outer tub 5 is fixed and finally the decorating frame 24 is attached.

Figure 5:
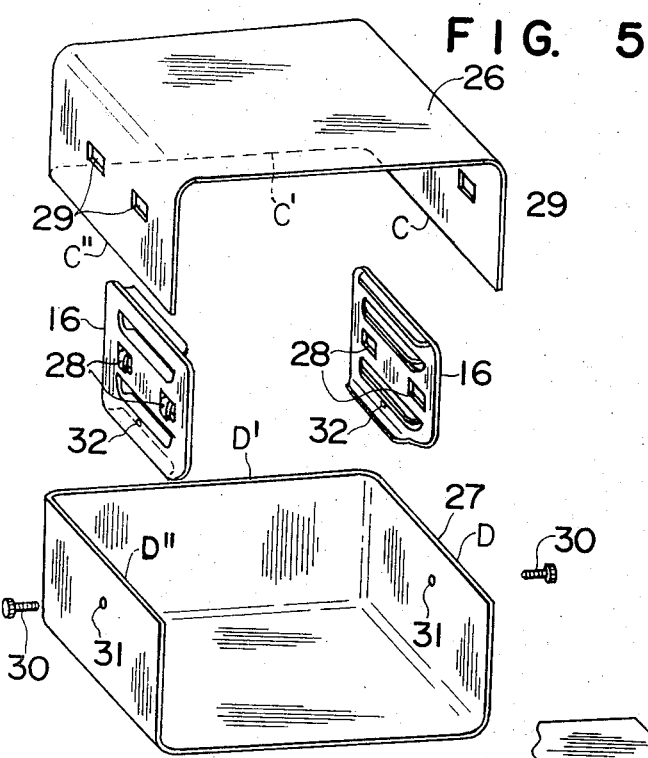
FIG. 5 is a disassembled perspective view of the inner housing structure.
Figure 6:
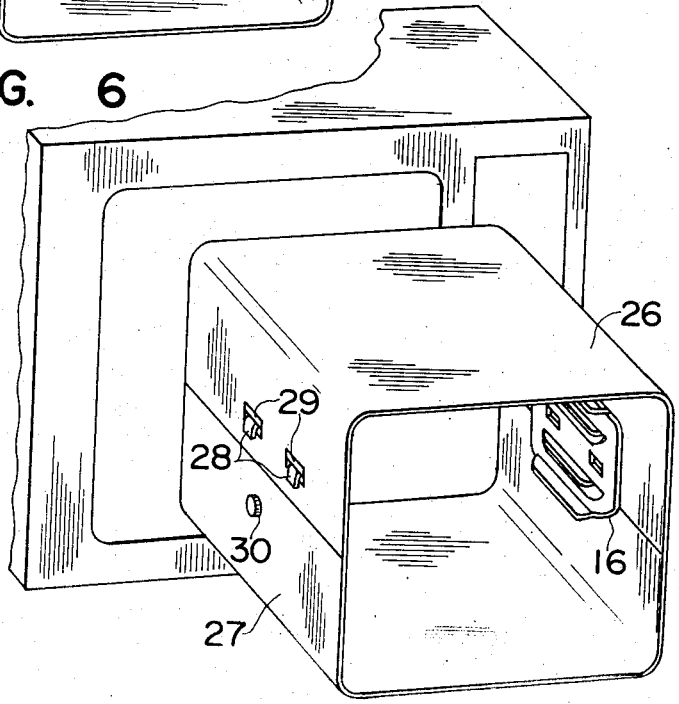
FIG. 6 shows how the inner housing can be drawn out.

The detailed structure of an inner tub structure is shown in FIGS. 5 and 6, the structure being designed for easy disassembly and assembly and easily and sufficiently washable. Namely, the inner tub 4 is divided into an upper member 26 and a lower member 27. Therefore, the upper member 26, the lower member 27 and the guide sleeves 16 can be separately washed, and there is no inconvenience in washing the whole structure. After washing, the end face D, D' and D'' of the lowermember 27 is butted against the end face C, C' and C'' of the upper member 26 in register and the hooks 28 of the guide sleeves 16 are engaged with the holes 29 formed in the upper member 26 of the inner tub 4 from the inside. Further, for eliminating the fluctuations of the guide sleeves 16, fastening screws 30 are inserted through holes 31 from the outside and fastened with the female screws 32 formed in the guide sleeves. Through the above steps, the inner tub can be assembled.

Figure 7:
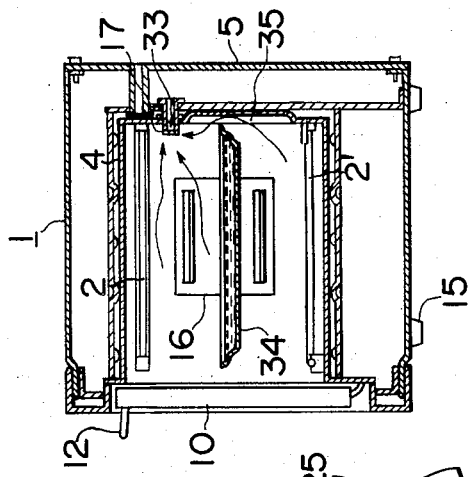
FIG. 7 is a cross-section showing the relation of the inner housing and a shallow pan.

FIG. 7 shows in cross-section the relation of the inner tub and a shallow pan for mounting foods to be cooked. The structure as described below is employed for smoothing the convection of the air in the heating and cooking chamber and making the temperatures in the whole chamber uniform to reduce the leading peak of the temperature. Namely, at an upper portion in the back wall of the inner tub 4, a temperature detecting element 33 is disposed in a thermistor box 17 having vents. Portions of the back wall of the inner tub 4 are convexly projected toward the outer tub 5 so that air flow paths 35 are formed even when the baking pan 34 is loaded.

Figure 8:
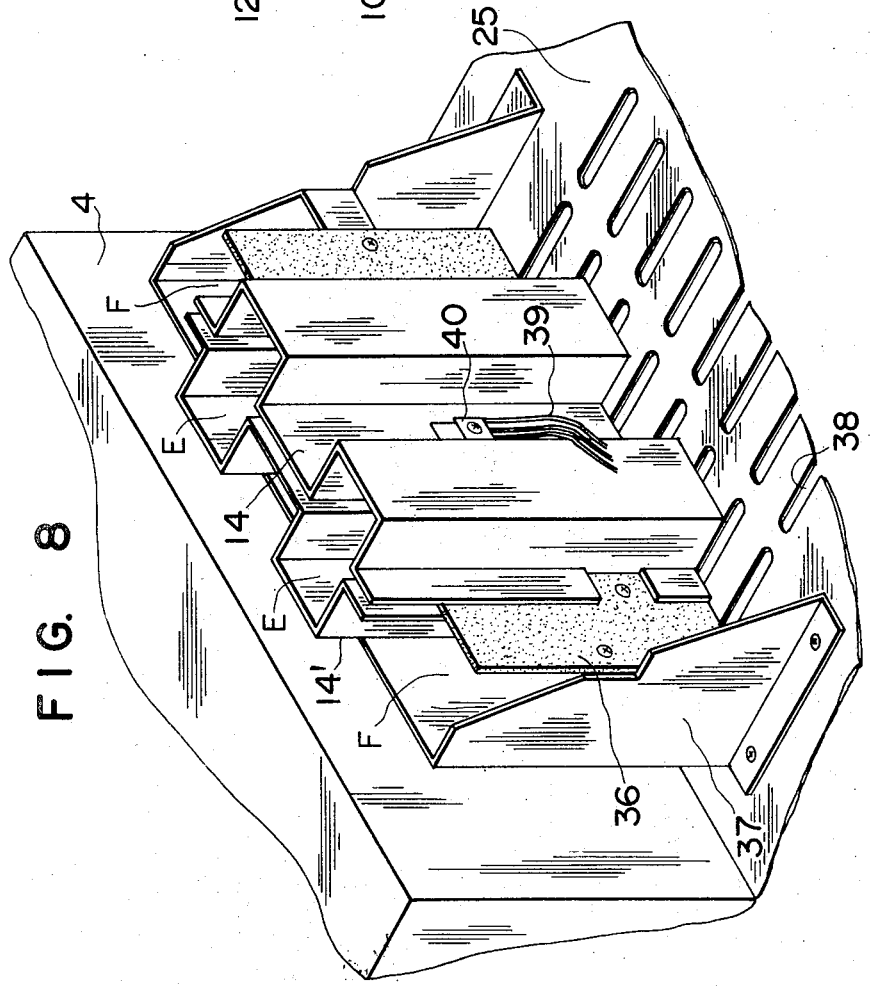
FIG. 8 is a perspective view of a heat radiating element for mounting a control element attached to the main housing.

FIG. 8 shows the structure of the heat radiating fins for mounting a controlling element which is one of the electronic parts used in this invention, which improves the heat radiating efficiency using the chimney effect, and is cheap and easy to assemble. Namely, heat radiating fins 14 and 14' are mutually fixed symmetrically by screws, etc through an electrical and thermal insulating plate 36 and this is mounted on a support metal 37 for shielding the radiation heat from the heat shield tub 6. In this case, the support metal 37 is fixed to the base plate 25 with screws, etc. so that the air flows efficiently along the heat radiating fins 14 and 14' and the back side of the portion of the metal support 37 facing the heat shielding tub 6. Further, a semiconductor element 40 provided with leadout lines 39 is fixed on the heat radiating fins 14 and 14'. By the above structure, an ascending air current from the air vent 38 formed in the lower portion is effectively led by the chimney effect of the ducts E surrounded by the heat radiating fins 14 and 14' and the groove F surrounded by the support metal 37 and the insulator 36 and is brought into contact with the heat radiating fins to exchange heat with the heat radiating fins. Thus, the heat radiating fins 14 and 14' need not be formed of commercially available expensive materials, but may be formed by pressing metal such as aluminum having a good heat conductivity. Thus, the heat radiating fins can be made very cheaply. Further, since the support metal itself is also deprived of heat by the chimney effect of the duct E, it is almost free from the temperature increase.

Figure 9:
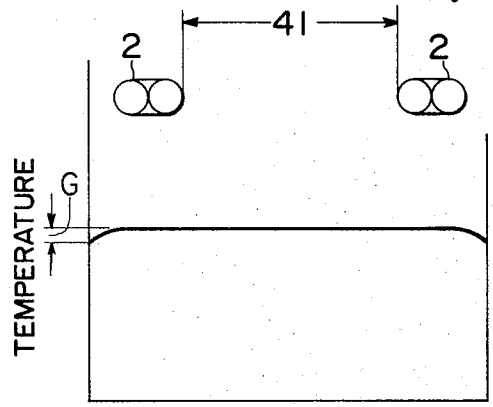
FIG. 9 is a schematic diagram showing a heater disposition and the temperature distribution in the baking plane according to this invention.
Figure 10:
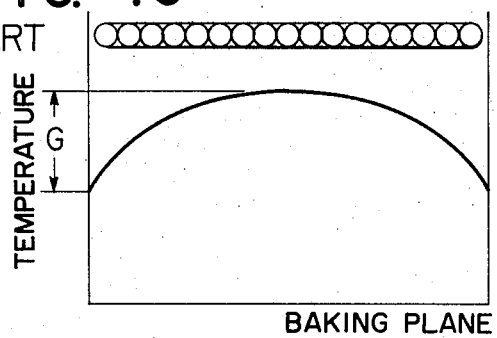
FIG. 10 is a schematic diagram of the conventional heater disposition and the temperature distribution in the baking plane.

The principles of the heater disposition are illustrated in FIG. 9, in which the temperature distribution in the heating and cooking chamber is made uniform so that food can be cooked uniformly. Comparison will be made with the conventional ones as shown in FIG. 10. Generally, an infrared heater employing radiation heating and the heating effect thereof is very good compared to convection and conduction heating. Further, an infrared heater has a smaller heat capacity compared to sheath heaters, etc. and the rate of temperature increase is fast. By these advantages reduction in cooking time can be expected. In forming a heating plane with a plurality of heater elements, however, the temperature distribution may lack uniformity according to the disposition of the respective heaters. For example, if a plurality of heaters is disposed at an equal spacing as shown in FIG. 10, the temperature difference G between the central portion and the two side portions of the heaters 2 becomes very large due to the heat concentration in the central portion and the heat radiation in the side portions so that uneven backing may occur. In the lower portions of FIGS. 9 and 10, the abscissa represents the baking plane in the oven and the ordinate represents the temperature. To eliminate the drawback of uneven baking, various methods can be thought of such as varying the capacities of the heaters, but they result in a complicated structure or an expensive system and have problems in practical use.

In the present oven as shown in FIG. 9, heaters 2 and 2' are disposed in the upper and lower portions of the inner tub 4 with a appropriate distance 41 therebetween in the longitudinal or the transverse direction.

Figure 11A:
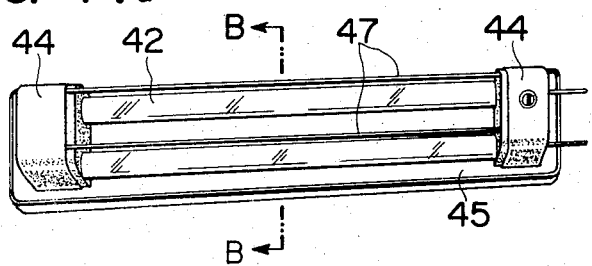
FIG. 11a is a perspective view of a heater structure according to the invention.
Figure 11B:
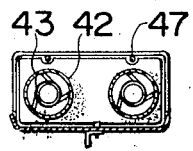
FIG. 11b is a cross section of the heater structure of FIG. 11a along the line B—B.

A concrete structure of a heater is shown in FIGS. 11a and 11b. A resistive member 43 is sealed in a quartz or crystalline glass tube 42 to form an infrared ray radiating heater. Both ends of the tube 42 are protected with protecting ceramics 44 and these protecting ceramics are fixed to a reflector 45. On the side of the tubes 42 opposite to the reflector 45, metal bars 47 are also disposed for the purpose of protecting the glass tubes 42.

Description will now be made of the controlling circuit of the electric oven as described above. FIG. 12 is a block diagram of a basic embodiment of the controlling circuit. An ac power source 50 supplies power to a thyristor means 51 having a control gate and controlling a heater unit 52. The heater unit is energized when said thyristor 51 becomes conductive. The controlling circuitry surrounded by the broken line with a dot is supplied power from a secondary power source 53. A thermistor 54 detects the temperature around said heater unit. A reference temperature is set in a reference temperature setting means 55. The reference and the real temperatures are compared in a comparator 56 which generates a differential output. A change-over switch 57 selects the heating mode of the convection, the infrared, and the yeast fermenting heating. Numeral 58 indicates a controlling portion for the convection heating which has a very small temperature variation width and generates no scorching, while 59 indicates a controlling portion for the infrared heating which has a large temperature variation width and generates scorching. Numeral 60 indicates a controlling portion for raising bread with yeast. A gate triggering signal generating portion 61 is activated by the signal from the respective heating controlling portions 58, 59 and 60 and supplies an output to the gate of said thyristor 51.

Figure 13:
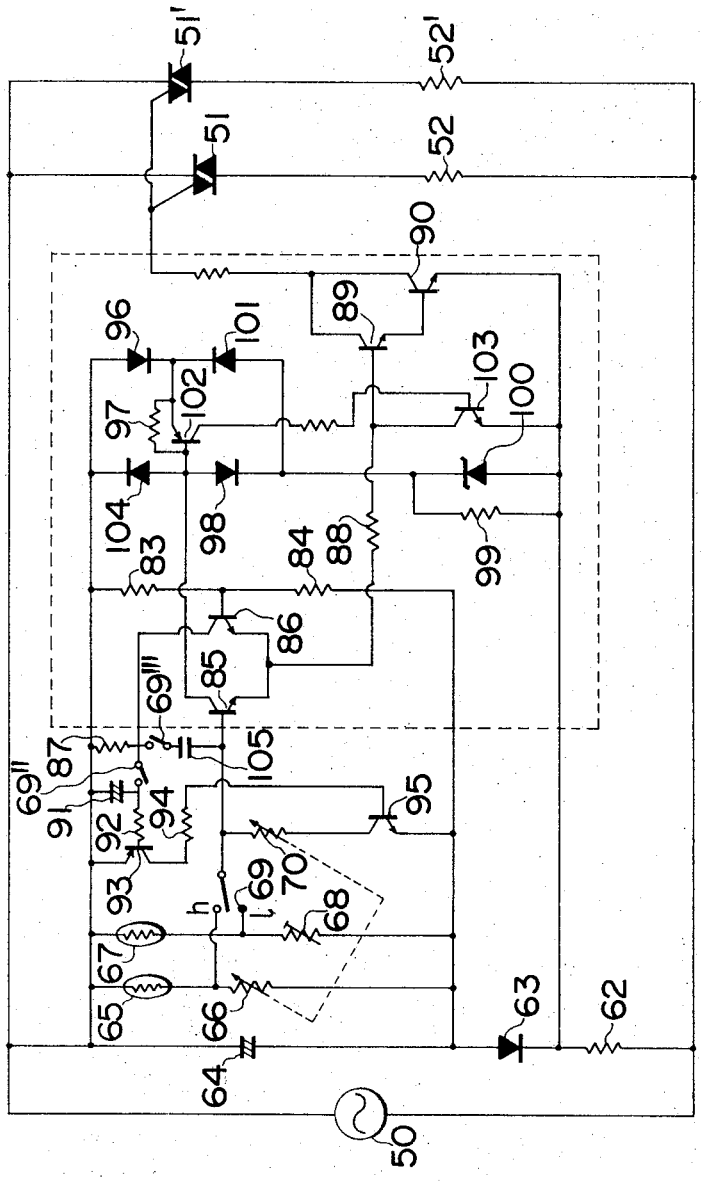
FIG. 13 is a concrete embodiment of the electric circuit of FIG. 12.

A concrete embodiment of the diagram of FIG. 12 is shown in FIG. 13, which employs the null voltage control method. In the figure, a secondary power source for controlling circuitry corresponding to the power source 53 in FIG. 12 is formed of a resistor 62, a diode 63 and an electrolytic capacitor 64. A first thermistor 65 for detecting the temperature and a variable resistor 66 for setting the temperature in the case of the infrared and the convection heating and a second thermistor 67 for detecting the temperature and a semi-fixed resistor 68 for setting the temperature in the case of fermenting yeast are connected to said secondary power source for the controlling circuitry through a change-over switch 69. Further, a variable resistance 70 for obtaining a constant temperature width in the case of the infrared radiation heating is also connected to the power source for the controlling circuitry. Controlling elements 51 and 51' having a gate and heaters 52 and 52' are respectively serially connected to the power source 50. A triggering signal is applied to the gates of the thyristors 51 and 51'. The heaters 52 and 52' are energized when the thyristors 51 and 51' are conductive.

Figure 14:
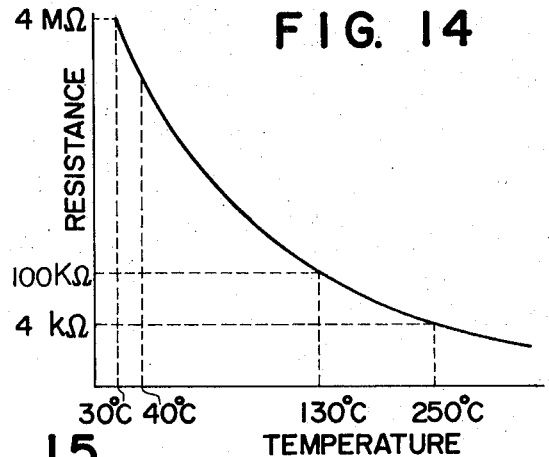
FIGS. 14 and 15 are characteristic curves of the thermistors of FIG. 13 used in the detecting portion for the infrared and convection heating and the yeast fermenting heating.
Figure 15:
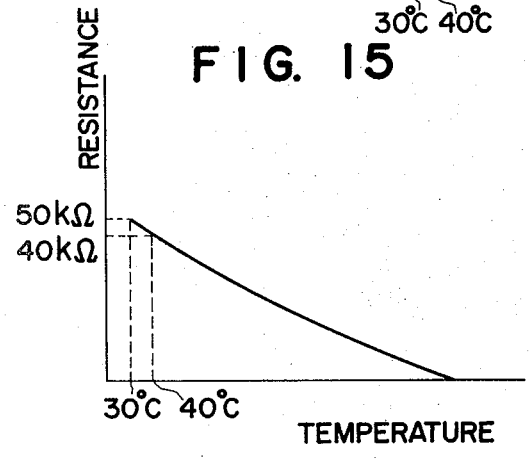

The characteristics of the two thermistors for the infrared ray and convection heating and the fermenting heating are shown in FIGS. 14 and 15. In FIG. 14, the thermistor for the infrared ray and convection heating works in the resistance range of 4 to 100 KΩ which corresponds to the temperature range of 130 to 250°C. In FIG. 15, the thermistor for the fermenting heating works in the resistance range of 40 to 50 KΩ which corresponds to the temperature range of 30 to 40°C. The combination of the thermistor 65 or 67 and a variable or a semi-fixed resistor 66 or 68 forms a voltage dividing circuit which forms a bridge with resistors 83 and 84. Transistors 85 and 86 form a differential amplifier. The change-over switch 69 and switches 69'' and 69''' select the circuit arrangement. The output of the differential amplifier is connected to transistors 89 and 90 in the emitter follower connection.

Figure 16:
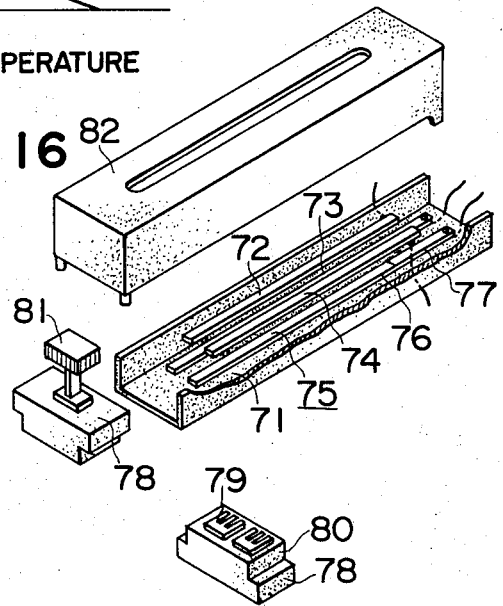
FIG. 16 is a perspective view of correlated variable resistors for setting the temperature of the infrared heating.

FIG. 16 shows a structure by which the infrared ray heating is done only in the region where the infrared ray heating is most effective. Namely, the variable resistance 66 for adjusting the atmosphere heating temperature and the variable resistor 70 for obtaining a constant temperature width in the case of the infrared ray heating are interlocked as is shown by the dotted line in the circuit of FIG. 13. The detailed structure will be described hereinbelow referred to FIG. 16. In FIG. 16, numeral 71 indicates a substrate formed of an insulating material, 72 a conductive member disposed on said substrate 71, 73 a resistive member for adjusting the temperature of the convection heating fixed adjacent to said conductive member 72, 74 another conductive member disposed in a similar manner, and 75 another resistive member for obtaining a constant temperature width in the case of the infrared ray heating. The resistive member 75 consists of a portion in which the resistance is infinite up to 200°C and another portion in which the resistance is finite above 200°C. A slidable member 78 has a conductive piece 79 for electrically connecting said conductive member 72 and said resistive member 73 and another conductive piece 80 for electrically connecting said conductive member 74 and said resistive member 75. These two pieces 79 and 80 are moved in common with a lever 81 to set the temperature in the oven. Numeral 82 indicates a casing covering these constituent components.

Figure 17:
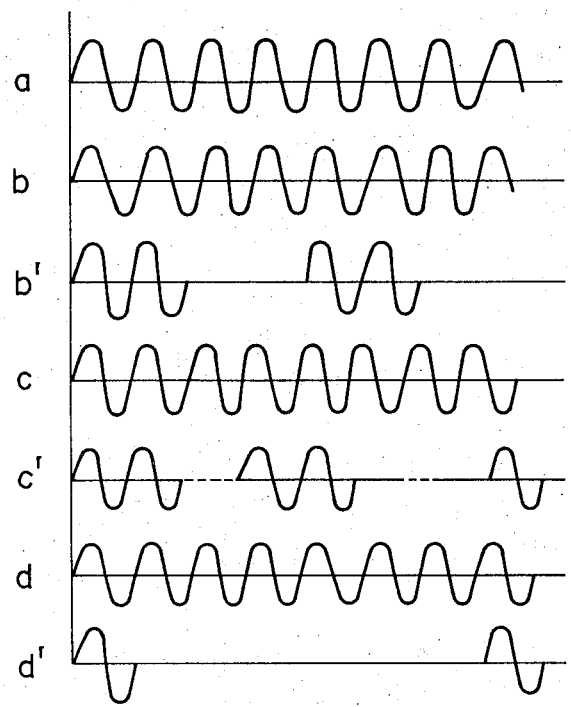
FIG. 17 shows voltage waveforms across the power source and the load in the circuit of FIG. 13.

The operation of the circuit as described above will be described hereinbelow. In the circuit of FIG. 13, a case of the infrared heating is first considered when the movable contact lever in the change-over switch 69 is connected to the contact $h$, the switch 69'' is closed and the switch 69''' is open. First, a case is considered when the set temperature is below 200°C and hence the infrared ray heating is ineffective. The capacitor 64 is charged from the power source 50 and forms a dc power source. The dc voltage is applied to the series connection of the temperature detecting thermistor 65 and the variable resistance 66 for setting the infrared ray heating temperature and further to the resistors 83 and 84 forming a bridge with said series connection. By the voltage difference between the connections between the thermistor 65 and the variable resistor 66, and between the resistors 83 and 84, one of the transistors 85 and 86 forming a differential amplifier is activated. In the present case, the resistance of the thermistor 65 is large and the transistor 86 is activated. Thus, a dc current is allowed to flow from the capacitor 64 through the resistor 87, the transistor 86 and the resistance 88 to activate the transistors 89 and 90 and to send a signal to the gates of the control elements 51 and 51'. Thus, a current is applied to the heaters 52 and 52' to perform heating. In this case, the transistor 93 is activated through the charge stored in the capacitor 91 and the resistance 94. Thus, the transistor 95 is also activated and the variable resistance 70 for obtaining a constant temperature width in the case of the infrared ray heating is connected in parallel to the variable resistor 66. In this case, however, the set temperature is below 200°C and the variable resistor 70 is infinite as is described in connection with FIG. 16. Thus, the resistor 70 connected in parallel to the resistance 66 can be neglected. Thus, the controlling elements 51 and 51' are carried into the conductive state by the output of control circuit of the null method. The heater temperature is controlled by the set temperature by the thermistor 65 and the variable resistor 66 in a similar manner to that of the convection heating. The voltage waveforms across the heater is shown by the curve $b$ in FIG. 17. In FIG. 17, curves $a$, $b$, $b'$, $c$, $c'$, $d$, and $d'$ represent voltage waveforms across the power source or the load.

Next, the case of the infrared ray heating is considered in which the set temperature is above 200°C. In this case, the resistance 70 interlocked with the variable resistor 66 for setting a constant temperature width in the infrared ray heating becomes finite. Thus, when the transistor 95 is activated, a parallel connection of the variable resistors 66 and 70 is formed and hence the total resistance is decreased. This gives an equivalent effect to raising the set temperature.

When the resistance of the thermistor 65 is reduced and the transistor 85 is turned on, a voltage of the normal polarity from the ac source 50 is transmitted through the diode 96, the resistor 97, the diode 98, the resistor 99, and the resistor 62, and that of the reversed polarity is transmitted through the resistor 62, the Zener diode 100, the diode 101, the resistor 97 and the diode 104. In this case, with a sinusoidal ac voltage the transistors 102 and 103 are activated in the whole range including the vicinity of zero voltage so as to block all the gate signals and thereby the energization of the heaters is stopped. At this moment, the voltage applied to the resistors 87 also disappears and the transistors 93, 89 and 95 are also turned off. Hence, the parallel resistance for the variable resistor 66 vanishes and the voltage applied across the variable resistor 66 increases. Thus, the time to the generation of a gate triggering signal and the beginning of the next heating is elongated, i.e., the time required to reach the set temperature is elongated. The on-off state of the heaters 52 and 52' and the voltage waveform are shown in FIG. 17. When a current if allowed to flow through the heaters 52 and 52' for a relatively longer period as shown by the curve $c'$ in FIG. 17 compared to the curve $b'$ in FIG. 17, the temperature of the heaters 52 and 52' increases extremely and the radiation energy which varies in proportion to the fourth power of the absolute temperature according to the StefanBoltzmann's low increases further greatly to generate scorching on the food in the oven.

Figure 18:
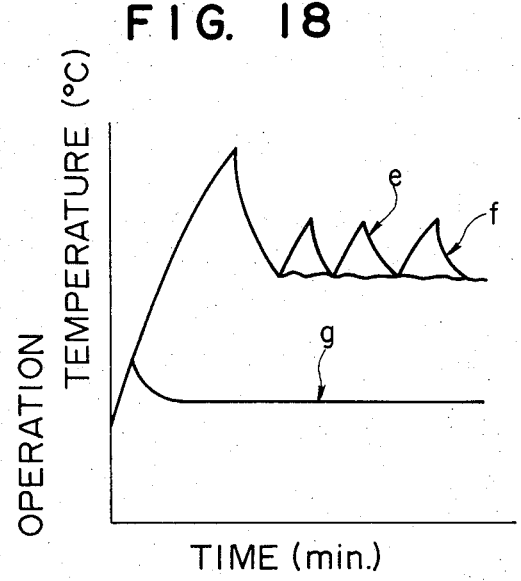
FIG. 18 shows temperature rise characteristics of the embodiment of FIG. 13 in the infrared and convection heating and in the yeast fermenting heating.

The temperature characteristics in this case is shown by the curve $e$ in FIG. 18. The temperature width (or variation) is large. The temperature of the heaters are raised by a longer current flow and the infrared radiation heating in proportion to the fourth power of the absolute temperature is greatly increased to generate scorching.

Next, the case of convection heating is considered when the change-over switch 69 is connected to the contact $h$, the switch 69'' is open and the switch 69''' is is closed. In this case, due to the dc voltage established across the electrolytic capacitor 64, the capacitor 105 is charged through the resistor 87. If the resistance of the thermistor 65 is large and hence the transistor 86 is activated, the output current becomes a gate triggering signal for the control elements 51 and 51' and turns them on similar to the case of the infrared heating. At the same time, the charge stored in said capacitor 105 is discharged. This discharging current works to raise the base voltage of the transistor 85. Thus, the transistor 85 is turned on when the transistor 86 is turned off. When the capacitor 105 is charged again, the actions of the transistors 85 and 86 are reversed, repeating said processes. Thus, the duty cycle in which the control elements 51 and 51' are conductive is determined. In this case, a current is allowed to flow in short repetitive periods so that the heating effect is alsmot due to the convection and a temperature control of high accuracy can be provided. The temperature characteristic of the above-described heating is shown by the curve $f$ in FIG. 18 which shows a smaller temperature width. This is usually called the convection heating. In this case, the on-off repetition cycle of the heaters 52 and 52' is shorter as shown by the curve $b'$ in FIG. 17, hence the temperature of the heater 52 and 52' is not raised much and is not much different from the ambient temperature and thus the foods can be cooked without scorching.

In FIG. 17, the power consumption in a constant time is the same for the curves $b'$ and $c'$. Therefore, the set temperature is the same as shown by the curves $e$ and $f$ in FIG. 18, but only the temperature width is varied.

Further, the case of fermenting heating will be considered when the change-over switch 69 is connected to the l side, the switch 69'' is open and the switch 69''' is closed. In this case, the semi-fixed resistance 68 is set so that the resistance of the negative characteristic thermistor 67 can be controlled around the temperature required for fermenting yeast, e.g., 37°C. Namely, the resistance range of 40 to 50 KΩ is used for this thermistor 67 in comparison to the conventional value of about 4 MΩ. Therefore, the adjustment of said semi-fixed resistance 68 is very easy.

In this case, the operation of the circuit is similar to the case of the convection heating, and the temperature characteristics as shown by the curve $g$ of FIG. 18 and the load voltage waveform as shown by the curve $d'$ of FIG. 17 are obtained.

FIG. 17 shows voltage waveforms at the power source and the load of the zero voltage control, in which curves $a$ represents the ac power source, $b$ the load voltage in the leading period of the convection heating, $b'$ the load voltage in the saturated period in the convection heating, $c$ the load voltage in the leading period of the infrared radiation heating, $c'$ the load voltage in the saturated period of the infrared radiation heating, $d$ the load voltage in the leading period of the fermenting heating, and $d'$ the load voltage in the saturated period of the fermenting heating.

Figure 19:
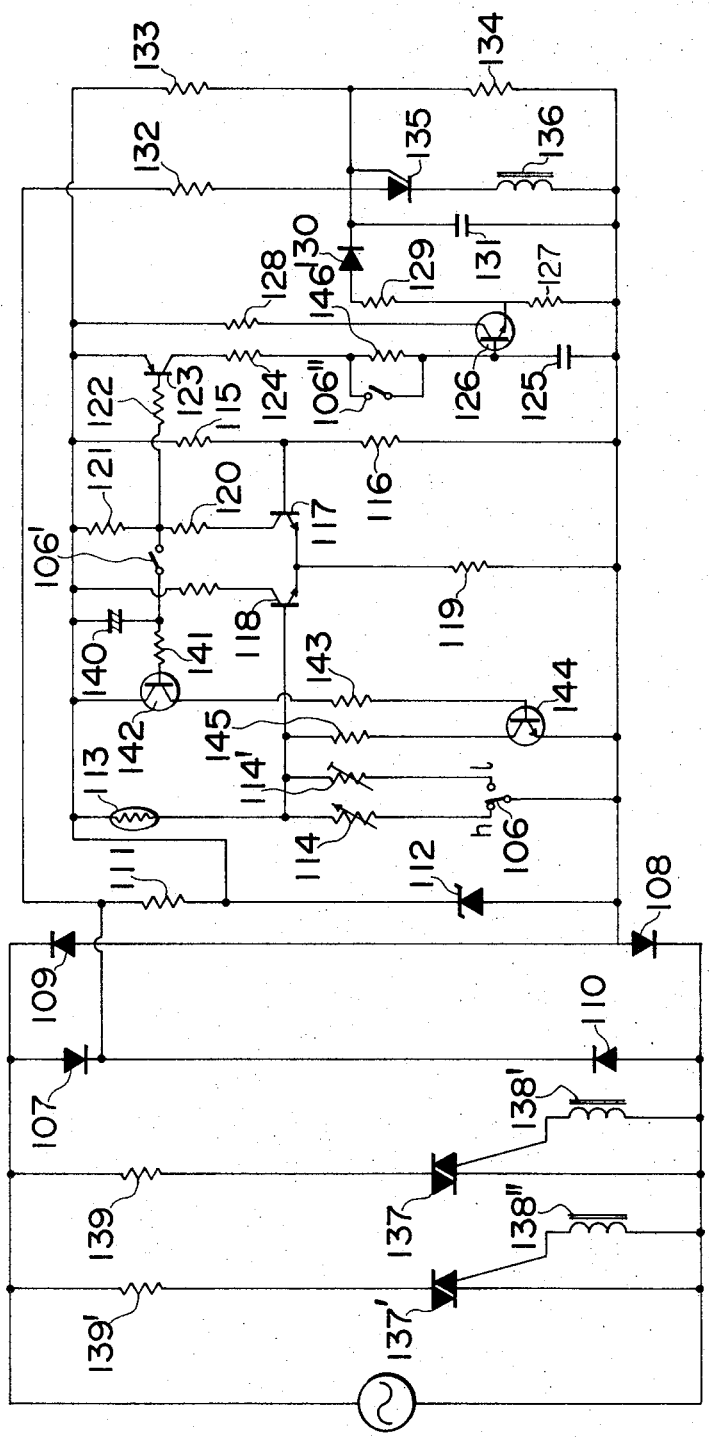
FIG. 19 is a circuit diagram of another embodiment according to this invention.

FIG. 19 shows another embodiment of this invention which employs the phase control method. First description will be made for the case of the convection heating in which a change-over switch 106 is connected to the h side and a switch 106' is open. In the figure, diodes 107, 108, 109 and 110, a resistor 111 and a Zener diode 112 form a secondary power source corresponding to the source 53 in FIG. 12, and a temperature sensing thermistor 113, a variable resistor 114 for setting the temperature in the convection and infrared radiation heating and a semi-fixed resistor 114' for setting the temperature in the fermenting heating are connected to said secondary power source through a change-over switch 106. Resistors 115 and 116 form a bridge with said thermistor 113 and said temperature setting resistor 114 or 114'. The output signal of this bridge is supplied to the differential amplifier consisting of transistors 117 and 118. The output of the transistor 117 is sent through resistors 119, 120, 121 and 122 to a transistor 123 to turn on the transistor 123. The output of the transistor 123 is sent through a resistor 124, a capacitor 125, a transistor 126, resistor 127, 128 and 129, and a diode 130 to a capacitor 131. Further, said capacitor 131 is charged through a resistor 133 in synchronism with the frequency of the power source (but it is arranged that the load cannot be activated only by this charging). When the voltage across the capacitor 131 becomes higher than that across a resistor 134 established by the current supplied through a resistor 133, a silicon controlled switch 135 is turned on and a pulse current is allowed to flow through the primary winding of a pulse transformer 136. The secondary windings 138' and 138'' of said transformer 136 are connected between the gate and the first electrodes of two control elements 137 and 137'. Therefore, when a pulse current is allowed to flow, the control elements 137 and 137' are turned on and thus heaters 139 and 139' are energized. When these heaters 139 and 139' are heated, the resistance of the thermistor 113 disposed in the neighborhood of the heaters is changed. When the preset value is realized, the transistor 118 is activated and the output through the transistor 117 vanishes. Thus, the gate signal disappears and the heaters 139 and 139' are no longer heated. A constant temperature is provided by repeating these processes.

Next, the case of the infrared radiation heating will be described in which the change-over switch 106' is closed. In this case, a capacitor 140 is charged by the voltage applied across a resistor 121. This then activates a transistor 142 through a resistor 141 and thereby activates a transistor 144 through a resistor 143. Then, a resistor 145 becomes to be connected in parallel with the variable resistor 114. The operational principles are similar to those in the case of zero voltage control of FIG. 13.

When the change-over switch 106 is connected to the side l and the switches 106' and 106'' are open, the circuit is for the fermenting heating in which case a resistance 146 is inserted in the circuit to reduce the load power. The operation is similar to that of the convection heating.

Figure 20:
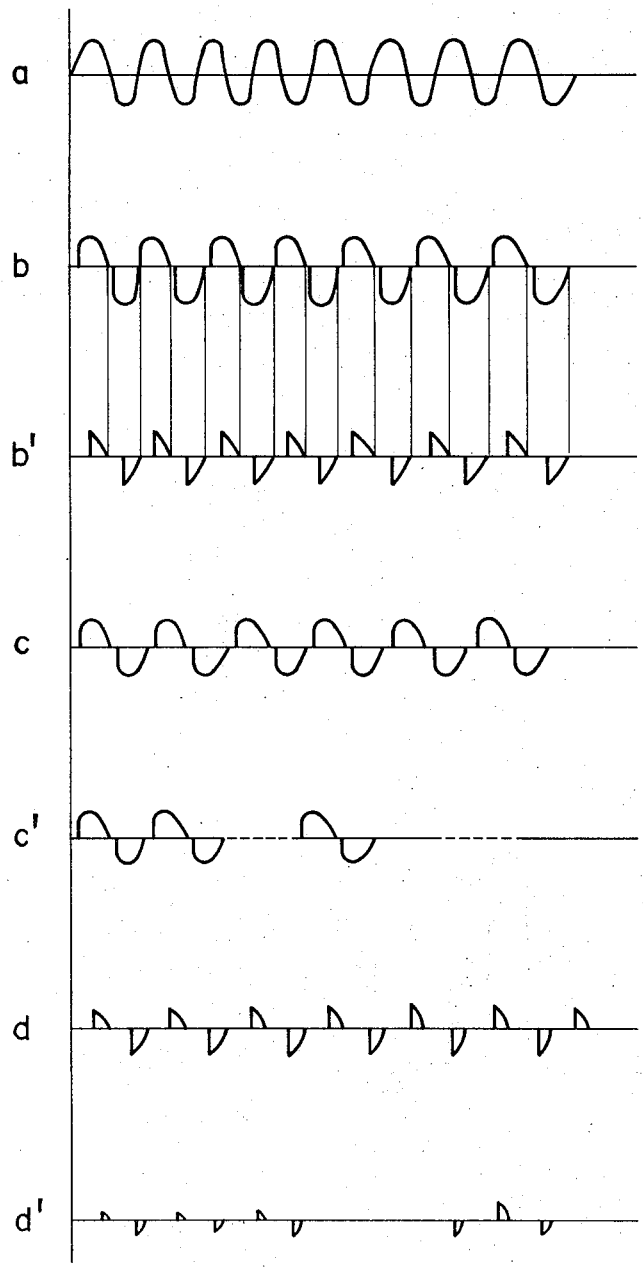
FIG. 20 shows voltage waveforms across the power source and the load in the circuit of FIG. 19.

FIG. 20 shows the voltage waveforms at the power source and the load in the case of the phase control. The curve $a$ represents the source voltage, $b$ the voltage across the load in the leading period of the convection heating, $b'$ the load voltage in the saturated period of the convection heating, $c$ the load voltage in the leading period of the infrared radiation heating, $c'$ the load voltage in the saturated period of the infrared radiation heating, $d$ the load voltage in the leading period of the fermenting heating, and $d'$ the load voltage in the saturated period of the fermenting heating.

The operational temperature characteristics of the circuit of FIG. 19 are similar to those of the circuit of FIG. 13 and can be represented by FIG. 18. Further, the temperature control in the convection and the infrared radiation heating can be done over the range of about 80° to 250°C from the temperatures required for cooking. Temperatures around 60°C are excluded since foods easily grow rotten at these temperatures and one point control at 37°C is particularly designed for fermenting yeast.

Figure 21:
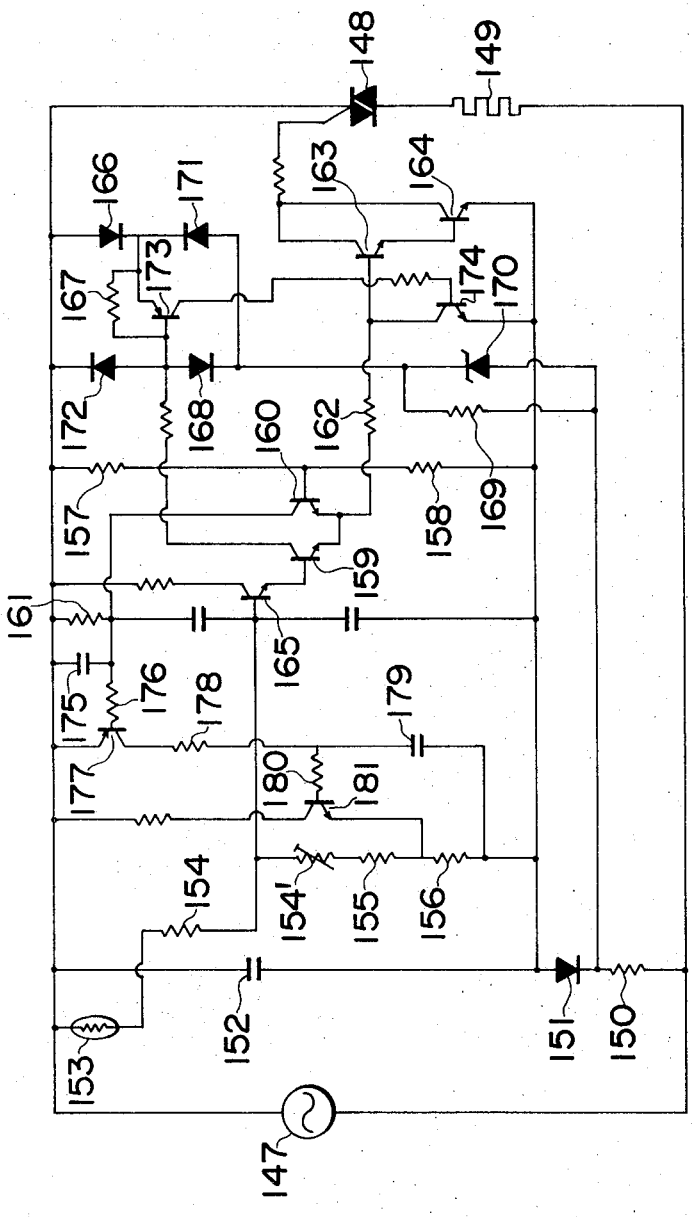
FIG. 21 is a circuit diagram of another embodiment of the control circuit for yeast fermenting heating according to this invention.

FIG. 21 shows another embodiment for fermenting yeast, in which a control element 148 having a gate and a heater 149 are serially connected between the terminals of a power source 147. The heater 149 can be heated by applying a triggering signal to the gate of the control element 148 to make it conductive. A resistor 150, a diode 151 and an electrolytic capacitor 152 form a power source for the controlling portion. A temperature sensing thermistor 153 and a semi-fixed resistor 154' for setting the temperature for the fermenting heating are connected to said power source for the controlling portion.

Description will now be made of the structure in connection with its operation. The capacitor 152 is charged by the ac power source 147 and forms a dc source. The voltage from the power source 147 is also applied dividedly to a series connection of the thermistor 153 for sensing the temperature and the resistor 154 and a reference voltage setting stage formed of the semifixed resistance 154' for setting the temperature in the fermenting heating and resistor 155 and 156. The voltage is also applied to resistor 157 and 158 which form a bridge with the reference voltage setting stage. The voltage difference between said reference voltage setting stage and the resistors 157 and 158 is applied to a differential amplifier consisting of transistors 159 and 160 and activate one of the transistors. In the present case, the resistance of the thermistor 153 is high and the transistor 160 is activated. Then, the dc current from the capacitor 152 flows through a resistor 161, the transistor 160 and a resistor 162 to apply to and activate transistors 163 and 164 in the emitter follower connection, thereby sending a signal to the gate of the thyristor 148. Thus, a current is allowed to flow through the heater 149 to achieve heating. When the resistance of the thermistor 153 is reduced and the transistors 165 and 159 are turned on, a voltage of normal polarity is transmitted through a diode 166, a resistor 167, another diode 147, and another resistor 169 and that of reversed polarity is transmitted through a resistor 150, a Zener diode 170, a diode 171, the resistor 167 and another diode 172. By the circuit arrangement described above, transistors 173 and 174 are turned on in the whole part of the sinusoidal waveform of the ac power source including the vicinity of zero voltage so as to block the gate current and stop the heat generation of the heater 149. When the transistor 160 is turned on, a voltage in established across the resistor 161 and charges up the capacitor 175. By this charge stored in the capacitor 175, the transistor 177 is also turned on through the resistor 176. Then, a capacitor 179 is charged through a resistor 178 and a transistor 181 is activated through a resistor 180. As the charging process proceeds, the voltage across the resistor 156 increases. When the temperature reaches the set temperature set by the variable resistor 154', e.g. 37°C, the gate current is blocked in the whole range of the ac source voltage including the vicinity of zero voltage by the action of the transistors 173, 159 and 174. Namely, if the transistors 165 and 159 are activated, the gate signal is perfectly stopped and the control element 148 is turned off to stop the current flow to the heater 149. Further, due to the circuit action including the transistors 177 and 181, the rated power is intermittently applied to the load to eliminate the temperature peak, conforming to the control of the fermenting heating.

Figure 22:
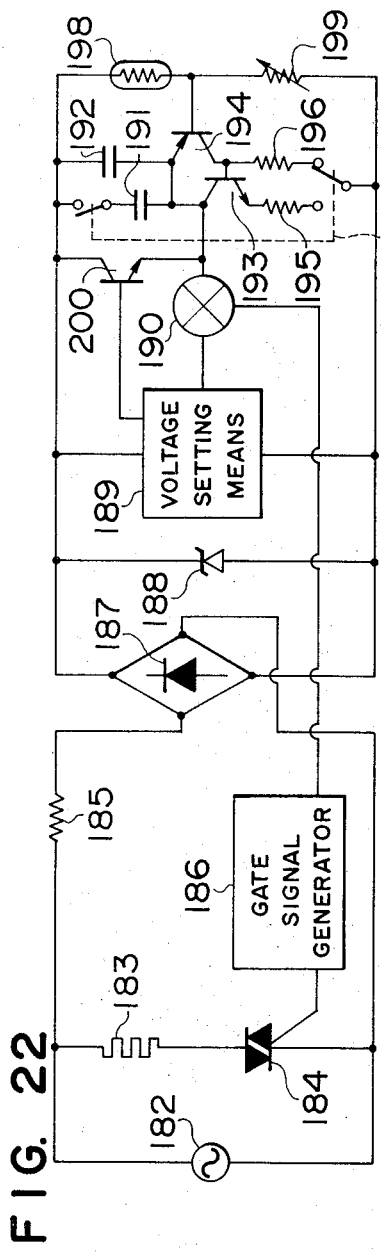
FIG. 22 is an electric block diagram of another embodiment of the control circuit for yeast fermenting heating according to this invention.

FIG. 22 shows another embodiment for achieving the fermenting heating in which excessive temperature increase in the oven is prevented and precise temperature control suitable for fermenting yeast is obtained. In the figure, reference numeral 182 indicates an ac power source, 183 a heater, 184 a three terminal bidirectional thyristor, 185 a voltage dropping resistor, 186 a gate signal generating circuit for supplying a signal to the gate of said thyristor 184 and rendering it conductive, 187 a diode bridge circuit for the controlling circuit, 188 a voltage stabilizing diode, 189 a reference voltage setting means, 190 a comparator, 191 and 192 capacitors, 193 and 194 transistors, 195 and 196 resistors, 197 a change-over switch, 198 a thermistor provided in the vicinity of said heater, 199 a variable resistor for determining the set temperature in combination with said thermistor 198, and 200 a transistor for discharging the capacitors 191 and 192 in each cycle of the power source in combination with the reference voltage setting means 189.

The operation of the circuit described above will be described hereinbelow. The voltages from the reference voltage setting means 189 and the temperature detected voltage generated from the combination of the thermistor 198 and the variable resistor 199 are compared in the comparator 190 and the output signal thereof is supplied to the gate signal generating circuit 186. Thereby a triggering current is allowed to flow through the gate to make the control element 184 conductive, and hence to energize the load heater 183.

Figure 24:
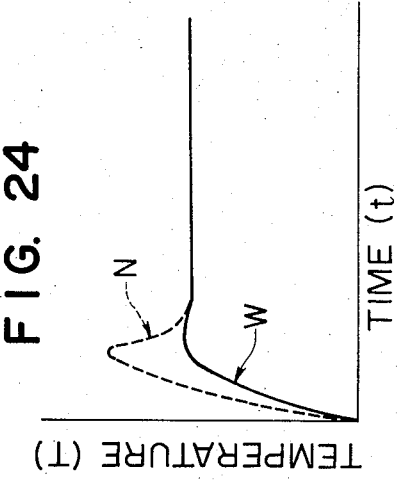
FIG. 24 shows the operational temperature characteristics in the two states of the embodiment of FIG. 22.
Figure 23:
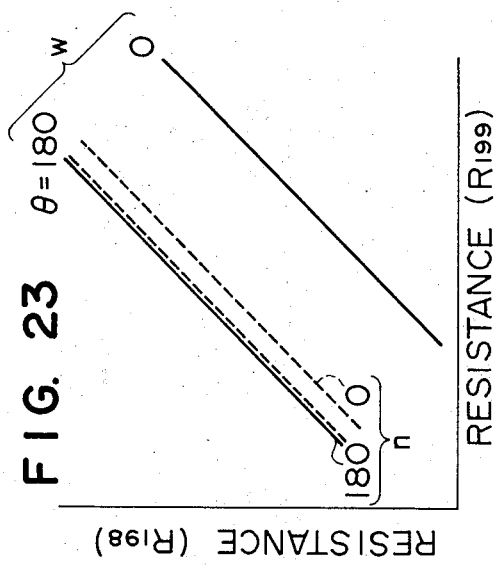
FIG. 23 shows the comparison of the proportional control portion in the two states of the embodiment of FIG. 22.

A case is considered now in which the circuit of the capacitor 191 is open as shown in FIG. 22. The capacitance of the capacitor 192 is selected to have a very small value, e.g. 0.022 or 0.033 $\mu$F, and thereby the charging time of the capacitor 12 is very short. Therefore, the capacitor 192 is charged in every cycle of the power source till the temperature detected voltage reaches the vicinity of the reference voltage. On the other hand, the output signal from the capacitor 190 is generated when the capacitor 192 is charged and the emitter voltage of the transistor 194 is lowered and hence the load current scarcely changes till the set temperature is reached. This relation is shown in FIG. 23 in which the ordinate represents the resistance of the thermistor 198 and the abscissa represents the value of the resistance for setting the temperature represented by the resistor 199. Dotted lines $n$ represents the characteristics of the case when the output signal of the comparator 190 is determined only by the characteristics of the capacitor 192. In this case the region where an output signal is available from the comparator 190 is very narrow using a sinusoidal waveform. The operational temperature characteristic according to this method is shown by the curve N in FIG. 24. As can be seen from FIG. 24 the rise time to the set temperature is very short, but a peaking is apt to appear.

Next, the case when the switch is changed over and the circuits of the capacitor 191 and also the transistor 193 are closed will be described. In this case, the capacitance of the capacitor 191 is selected larger than the capacitance of the capacitor 192, e.g. 0.056 to 0.22 $\mu$F, and the resistance of the resistor 195 is also selected to be larger than the resistance of the resistor 196 to make the time constant large. Then, the charging time of the capacitor 191 becomes relatively long. Thus, the temperature detected voltage also changes according to the resistance change of the thermistor 198 due to heating. At the same time, the charging time of the capacitors 191 and 192 are changed. Thus, the phase of the signal generation from the comparator 190 in every cycle of the power source also changes. This relation is shown by solid lines $w$ in FIG. 23. Namely, the range where an output signal is available becomes much wider. Therefore, as can be seen from curve W in FIG. 24 the load power as well as the excess temperature increase is reduced and the leading peak is removed.

What is claimed is:

1. An electric oven for preparation of food comprising:

a. a main housing including 1. an inner tub defining therein a heating chamber, 2. an outer tub surrounding said inner tub, said tubs having openings in their front portions to permit access to said chamber, 3. door means for closing the openings in said tubs, 4. electric heat generating means for heating said chamber, and 5. temperature detecting means for sensing the temperature within said chamber, b. a control element having a controllable gate for coupling said heat generating means to a power source, and c. temperature controlling means including 1. temperature setting means for generating an input corresponding to a desired temperature within said chamber, 2. convection controller means operative within a relatively narrow range of temperature change for controlling preparation of food without scorching, 3. infrared controller means operative within a relatively wide range of temperature change for controlling preparation of food with a desired amount of scorching, 4. fermentation controller means operative within a predetermined temperature range for controlling breadyeast fermentation, 5. means selectively coupling said temperature sensing and temperature sensing means to said convection, infrared and fermentation controller means, the signal coupled to said controller means corresponding to the difference between the outputs of said temperature sensing and temperature setting means, and 6. gating means coupling said convection, infrared and fermentation controller means to the gate of said control element, said control element controlling said heat generating means in response to the output of said temperature sensing means.

2. An electric oven according to claim 1, in which said fermentation controlling means for the yeast fermenting heating comprises, differential amplifier consisting of a first and second transistors coupled to the gate of said control element, and means for reducing the power consumption by detecting a part of the output of the first transistor and adding it to the input of the second transistor thereby changing the set temperature in the temperature detecting means.

3. An electric oven according to claim 1, in which said temperature detecting means includes a first thermistor for detecting the temperature in the case of convection and infrared radiation heating and a second thermistor for detecting the temperature in the case of yeast fermenting heating.

4. An electric oven according to claim 1, in which said temperature controlling means is wired totally on a print substrate and detachably mounted on a front board of the main housing.

5. An electric oven according to claim 3, in which said temperature controlling means includes a variable resistance element for setting the temperature consisting of a portion of infinite resistance and a portion of finite resistance said variable resistance element being connected to said first thermistor.

6. An electric oven according to claim 1, in which said heat generating means consists of heater units disposed with an arbitrary spacing in the longitudinal or the transverse direction with respect to the baking plane in the heating chamber.

7. An electric oven according to claim 1, in which said main housing further comprises a base plate, a heat shielding tub forming a heating chamber therein, and a front plate having a front opening, said base plate, said front plate and said heat shielding tub being made unitary to give solidity to the total structure, said inner tub, said outer tub and said heat shielding tub forming double heat insulating layers of air.

8. An electric oven according to claim 7, in which said inner tub is divided in two portions which are provided with guide sleeves disposed on the inner side wall of the inner tub and fastening means.

9. An electric oven according to claim 7, further comprising a pair of heat radiating fins for mounting said control element disposed in the space between the heat shielding tub and the outer tub.

10. An electric oven according to claim 7, in which said heat shielding tub has a plurality of projections formed toward the inner tub.

11. An electric oven according to claim 7, further comprising an air path for uniformalizing the temperature within the heating chamber formed between the back plate of the inner tub and the back edge of a baking sheet when a backing sheet is inserted in the heating chamber.

12. An electric oven having temperature controlling means for fermenting yeast comprising:

a. a heating chamber, b. electric heater means disposed within said heating chamber, c. a control element having a controllable gate coupled in series with said heater means, said series-connected control element and heater means being energized by a power source, d. voltage setting means, e. temperature detecting means and a resistance element for determining the temperature within said oven, one end of said temperature detecting means being connected to one end of said resistance element, f. comparator means having a first input coupled to said voltage setting means, a second input, and an output coupled to the gate of said control element, g. a first transistor having first, second and base electrodes, the first electrode being connected to the second input of said comparator means and the base electrode to the junction of said temperature detecting means and said resistance element, the output of said comparator being determined by said voltage setting means, said temperature detecting means and said resistance element, h. a first capacitor coupled between the first electrode of said transistor and the other end of said temperature detecting means, said first capacitor, first transistor and said resistance element comprising narrow proportional control means, i. a second capacitor, j. a second transistor having first, second and base electrodes, the base and second electrodes of said second transistor being coupled to the second and first electrodes of said first transistor respectively, and k. change-over switching means for coupling said second capacitor in parallel with said first capacitor and switching the other end of said resistance element from the second electrode of said first transistor to the first electrode of said second transistor, said change-over switch switching from narrow to wide proportional control.

* * * * *